(12) United States Patent
Elmoujarkach et al.

(10) Patent No.: US 10,877,166 B1
(45) Date of Patent: Dec. 29, 2020

(54) SLOW NEUTRON CHEMICAL DOSIMETER USING CR(VI)—GD MIXTURE

(71) Applicant: King Abdulaziz University, Jeddah (SA)

(72) Inventors: Ezzat Elmoujarkach, Jeddah (SA); Fathi Djouider, Jeddah (SA); Mohammed Al Johani, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/994,749

(22) Filed: Aug. 17, 2020

(51) Int. Cl.
| G01T 1/04 | (2006.01) |
| G01T 1/204 | (2006.01) |
| G01T 1/203 | (2006.01) |
| G01T 3/06 | (2006.01) |

(52) U.S. Cl.
CPC .............. *G01T 1/04* (2013.01); *G01T 1/2033* (2013.01); *G01T 1/2042* (2013.01); *G01T 3/06* (2013.01)

(58) Field of Classification Search
CPC .... G01T 1/06; G01T 1/08; G01T 1/04; G01T 1/11; G01T 1/023; G01T 3/06; G01T 3/008; C02F 1/62; C02F 1/008
See application file for complete search history.

(56) References Cited

U.S. PATENT DOCUMENTS

| 6,582,657 | B2 | 6/2003 | Warner et al. |
| 9,568,623 | B2 | 2/2017 | Sahu et al. |
| 9,759,821 | B2 | 9/2017 | Noh et al. |
| 2008/0285038 | A1* | 11/2008 | Djouider ................... G01T 1/04 356/440 |

FOREIGN PATENT DOCUMENTS

| FI | 90288 | 9/1993 |
| JP | 2010181412 | 3/2010 |
| WO | 2005106532 | 11/2005 |

OTHER PUBLICATIONS

NPL search (Year: 2020).*
Lan et al., "Two-step coprecipitation method for differentiating chromium species in water followed by determination of chromium by neutron activation analysis", Analyst, Issue 1, 1991.
Van Der Sloot, "The determination of chromium in water samples by neutron activation analysis after preconcentration on activated carbon", Journal of Radioanalytical Chemistry, vol. 37 (1977)727-739.

* cited by examiner

*Primary Examiner* — David P Porta
*Assistant Examiner* — Mamadou Faye
(74) *Attorney, Agent, or Firm* — W & C IP

(57) ABSTRACT

Neutron dosimetry is performed using a water-based chemical dosimeter measurement of radiation-induced reduction of hexavalent Cr (VI) to trivalent Cr (III) in the presence of sodium formate at pH 9.2. Neutron absorbance material (Gd-157) increases the neutron interaction with the dosimeter. When a monoenergetic beam with 0.025 eV energy was used as a thermal neutron source 1 mol/dm$^3$ of Gadolinium gave the best outcome while surrounding the dosimeter with 1 cm Gadolinium sheets. The dosimeter was giving acceptable readings when using thermal neutrons.

14 Claims, 8 Drawing Sheets
(2 of 8 Drawing Sheet(s) Filed in Color)

Spectrophotometric analysis of Cr(VI) in the irradiated sample

SLOW NEUTRON CHEMICAL DOSIMETER USING CR(VI)—GD MIXTURE

BACKGROUND OF THE INVENTION

Field of the Invention

The invention generally relates to a water-based chemical dosimetry system for monitoring and measuring a neutron dose. The invention further relates to a method of measuring radiation induced changes in amounts of Cr(VI) using UV/Vis spectrophotometry with gadolinium as an activation material.

Background

Detection and measurement of thermal neutrons for the Boron-Neutron Capture Therapy (BNCT) neutron channel has always been a targeted area for research due to the lack of good neutron detection systems. The most common neutron dosimeter is the Bonner Sphere Spectrometer (BSS). The BSS method employs thermal neutron detectors embedded in moderating spheres of different sizes. Comparison of the neutrons detected by each sphere allows accurate determination of the neutron energy. The original detector system, capable of measuring neutrons between thermal energies up to ~20 MeV, has been modified to provide additional resolution above 20 MeV to energies up to 1 GeV. Because of the complexity with which neutrons interact with the environment, precise determination of the neutron energy is quite difficult. Bonner sphere spectroscopy (BSS) is one of the few methods that provide an accurate measure of the neutron spectrum. Hurst Counters are used for neutron dosimetry, wherein the neutron dose rate is measured by the proton recoil proportional counter (Tagziria and Hansen, 2003. *Radiat Prot Dosimetry* 107(1-3):73-93. With advancement in materials fabrications, new types of neutron dosimeters have been introduced using a compact plastic scintillation detector and silicon photomultiplier (SiPM) (Preston and Tickner, 2017. *Radiat Prot Dosimetry* 175(3):406-412; Hawkes et al., 2016. *Radiat Phys Chem* (140), September 2016:11-14).

Chemical dosimetry is based on the property of ionizing radiation to produce highly reactive free radicals in response to interaction of the radiation with water molecules of an aqueous solution. When metal ions are dissolved in the aqueous solution, the interaction of free radicals with the dissolved metal ions changes the oxidation state of the metal ions. For example, chromate ions will change from the hexavalent Cr(VI) state to trivalent Cr(III), and ferrous metal ions change from ferrous to ferric, such as Iron (II) oxide to iron (III) oxide. Measurement of this change in oxidation state can be interpreted as a cumulative measurement of radiation dose.

The accuracy of chemical dosimetry depends upon the invariance of the yield of primary radicals in a given system per unit of absorbed dose. The gray (Gy), a unit of the radiation absorbed dose that measures the energy deposited by ionizing radiation in a unit mass of matter being irradiated, is used for measuring the delivered dose of ionizing radiation in applications such as radiotherapy, food irradiation and radiation sterilization and predicting likely acute effects, such as acute radiation syndrome in radiological protection. Use of chemical dosimetry is well established for kilogray (kGy) dose ranges at standardizing laboratories for reference dosimetry services, such as the National Physical Laboratory in UK. Chemical dosimeters, such as oxidation of ferrous ions to ferric ions in so-called Fricke solution dosimetry, extend reference dosimetry up to doses as high as 40 kGy.

One of the primary considerations in the selection of materials for neutron therapy and dosimetry is that the neutron absorption and scattering properties of the material should be similar to those of muscle tissue over the broad range of neutron energies used in neutron therapy. Secondary considerations are that the material should be well-defined, stable, and the ingredients readily available. Water has proven to be a suitable liquid for photon and electron beams, however, water is neither tissue-equivalent in terms of its elemental composition nor in terms of its density. Its neutron absorption and scattering properties cannot be expected to be identical to those of a truly tissue-equivalent liquid over the broad range of neutron energies used in neutron therapy. An important advantage of using a chemical solution dosimeter is the tissue-equivalency that makes it relevant to human or animal exposure to gamma/X-ray radiations and or ionizing radiations. However, chemical dosimetry is not available for thermal neutron dosimetry. Thus, a need exists for detection and measurement of neutron irradiation using a system and method with the convenience and tissue-equivalency of chemical dosimetry.

Prior to development of the invention disclosed herein, the use of a dichromate solution for dosimetry has thus far been limited to gamma and electron beam. Neutron dosimetry is very specific, since the neutrons are electrically neutral particles, thus they are mainly subject to strong nuclear forces but not to electric forces. Therefore, neutrons are not directly ionizing and they have usually to be converted into charged particles before they can be detected. Generally, every type of neutron detector must be equipped with converter (to convert neutron radiation to common detectable radiation) and one of the conventional radiation detectors (scintillation detector, gaseous detector, semiconductor detector, etc.). Table 1 is a summary of the current state of neutron dosimetry methodology.

TABLE 1

Summary of the neutron detectors in operation in the field of dosimetry.

| Dosimeter | Dose to tissue accuracy determination (%) | | Relative sensitivity (%) | | Neutron Energy dependence relative to Tissue |
|---|---|---|---|---|---|
| | Neutron | Gamma-ray | Neutron | Gamma-ray | |
| Ionization chamber - tissue equivalent | 5-10 | 2-5 | 100 | 100 | Very low |
| Ionization chamber | — | 3-20 m | 2-30 | 100 | Moderate |
| GM counter | — | ~6 | 0.1-3 | High | Dependence on energy |

TABLE 1-continued

Summary of the neutron detectors in operation in the field of dosimetry.

| Dosimeter | Dose to tissue accuracy determination (%) | | Relative sensitivity (%) | | Neutron Energy dependence relative to Tissue |
|---|---|---|---|---|---|
| | Neutron | Gamma-ray | Neutron | Gamma-ray | |
| Proportional counter - tissue equivalent | 5-10 m | — | High | High | Very low |
| Calorimeter | ~5 | 0.5-2 | Low | Low | Very low |
| Photographic film | — | 5-10 | 1-4 | Moderate | Dependence on energy |
| TLD | 10-20 | 10-20 | 3-35 | Moderate | Moderate |
| Scintillation (organic) | — | — | Very high | Very high | Low |
| Semiconductor | 10-15 m | — | Moderate | ~0.1 | Moderate |
| NSTD | 5-10 m | — | Low | Very low | High |
| Fission chamber | 5-10 m | — | Moderate | Very low | Moderate |
| Ferrous sulfate | 10-15 | 2-6 | Low | Moderate | Moderate |

U.S. Pat. No. 6,582,657B2 discloses an ionizing radiation dosimeter and a method of determining an ionizing radiation dose using the dosimeter. The dosimeter uses silver halide particles in an opaque chamber which upon exposure to ionizing radiation produce metallic silver. After the exposure, a chamber containing a reducing agent solution is broken, allowing contact between the reducing agent and silver halide particles not reduced by the ionizing radiation, producing a color change from either the reducing agent or an optional pH-sensitive dye or indicator based upon the amount of silver halide not reduced by the ionizing radiation. Chromium (II) complexes are disclosed as reducing agents, which are oxidized to chromium (III) during the reducing of the silver halide.

JP2010181412A discloses a device for measuring and determining the type of ionizing radiation and a method of its use. The device comprises three distinct scintillators comprising different scintillation materials and which each emit at distinct wavelengths and are sensitive to one or more types of radiation. Measurement of the ionizing radiation is accomplished using the intensity of the emission and determination of the type of ionizing radiation is accomplished by observing which scintillators are activated by the ionizing radiation. Chromium (III)-doped gadolinium gallate and chromium (III)-doped gadolinium vanadate are disclosed as possible identities for one of the scintillation materials.

FI90288B discloses a gamma and microwave radiation detector/dosimeter and a method of its use. The detector/dosimeter comprises droplets of a high vapor pressure liquid dispersed in an elastic solid medium. Upon exposure to gamma or microwave radiation, the droplets boil, creating detectable bubbles in the elastic solid medium. The reference indicates a chromium dye is typically in the form of a gel sealed into a thin plastic tube with epoxy.

U.S. Pat. No. 9,568,623B2 discloses a neutron detector comprising detector tubes filled with liquid scintillator comprising an ionic liquid, an optical attenuator, and at least one of a scintillation enhancer and a moderator, and photodetectors located at the ends of the detector tubes. Chromium is mentioned as a metallic coating to form a reflective layer on the outside of the detector tubes.

WO2005106532A2 discloses a neutron radiation dosimeter comprising a detection element surrounded by a neutron converter, surrounded by a spherical body of a hydrogen containing material.

U.S. Pat. No. 9,759,821B2 discloses scintillating organic materials for neutron and gamma ray detection and a method of detecting neutrons and gamma rays using said materials.

Lan, et. al. (*Analyst* 1991.(116):35-38) discusses the determination of the amounts of Cr(VI) and Cr(III) in water by selective co-precipitation with a lead pyridine dicarboxylate complex at different pH values.

Van Der Sloot (*J Radioanalyt Chem* 1977(37):727-739]) discusses a method for the determination of total chromium in seawater involving reduction of chromate using sodium sulfite, concentration of dissolved chromium on activated carbon, and neutron activation analysis of the chromium-loaded carbon.

SUMMARY OF THE INVENTION

The invention is a novel method of neutron detection and dose measurement by using chemical dosimetry. The chemical dosimetry is based on ionizing radiation interacting with water molecules of an aqueous solution comprising a solution of chromate ions. The interaction of ionizing radiation with the water molecules produces highly reactive free radicals that induce redox reactions with the chromate ions and change their oxidation state from Cr(VI) to Cr(III). The chemical dosimeter of the invention and method of its use provide a device for detecting a neutron radiation dose and a means for measuring it. The device may be a tabletop device or a portable device.

In some embodiments, the solution is encased in a container, such as a 10×10×10 cm cube made of Plexiglas poly(methyl methacrylate) (PMMA) (thickness between 0.2 to 0.5 cm) having 5 of its faces covered with gadolinium (thickness between 0.1 to 1 cm). The concentration of the radiolytically bleached Cr(VI) is read on a separate spectrophotometer at a wavelength of 370 nanometer. Suitable spectrophotometers are known in the art (e.g. Biochrom WPA Biowave DNA Life Science Spectrophotometer and the Biochrom Libra S80). A UV/visible spectrophotometer reads the amount of Cr(VI) which has been bleached (transformed to Cr(III)).

An aspect of the invention provides a chemical dosimeter for measuring an absorbed neutron dose, comprising a container holding an aqueous solution (e.g. at pH 9.2) of hexavalent chromate ions and gadolinium dissolved in the presence of sodium formate. Five faces of the cubic container are covered by sheets of gadolinium (thickness between 0.1 to 1 cm). The sixth face of the container is not covered by gadolinium and plays the role of "window" for receiving neutron radiation. The container may be surrounded by 1 to 6, e.g. 5 layers of gadolinium sheets. The measurement of the radiolytically bleached Cr(VI), by spectrophotometry, is directly related to the neutron absorbed dose.

In one embodiment, the concentration of chromate ions is in the range of 0.001 mole/dm$^3$ to 0.1 mol/dm$^3$, and the concentration of gadolinium dissolved in the aqueous solution is in the range 0.01 mol/dm$^3$ to 1 mol/dm$^3$ and the concentration of sodium formate is in the range of 0.01 mol/dm$^3$ to 0.1 mol/dm$^3$.

The sheets of gadolinium surrounding the container of the aqueous solution typically have a thickness of 0.1 to 1 centimeter. In one embodiment, the chemical dosimeter of the invention has at least 5 sheets of gadolinium, and each sheet has a thickness of 1 centimeter.

In one embodiment, the container of aqueous solution and the surrounding layers of gadolinium sheets are further enclosed within a plastic or glass housing material, such as a plexiglass poly(methyl methacrylate) (PMMA) housing material.

In another embodiment, the container and surrounding layers of gadolinium sheets are further enclosed within a plastic or glass (e.g. Plexiglass) housing material forming a portable or tabletop device suitable for detecting or monitoring neutron radiation, such as the hand-held device known in the art as a Geiger counter.

In yet another embodiment, the invention is a method of measuring a dose of neutron radiation. A chemical dosimeter is provided as as a hand-held or table-top device for experimental or monitoring applications. The dosimeter comprises a container holding an aqueous solution of chromate ions having a known oxidation state and gadolinium dissolved in the aqueous solution, wherein the container is surrounded by 1 to 6 layers of gadolinium sheets having a window for receiving ionizing neutron radiation into the container holding the aqueous solution. When the dosimeter has been exposed or potentially exposed to a source of neutron radiation the dosimeter is read by determining the change in oxidation state of the chromate ions. The chromate ions have a starting oxidation state of Cr(VI) and measuring an absorbed neutron dose comprises measuring the amount of chromate ions with an oxidation state of Cr(VI) following a known or suspected exposure to neutron radiation. The final dose is calculated using the following formula:

$$\text{Absorbed dose (Gy)} = 1.04 \times 10^3 \times \Delta(OD)$$

where $\Delta(OD)$ is the change in the absorbance at 370 nm (measured spectrophotometrically) of the irradiated Cr—Gd-formate solution. $\Delta(OD)$ depends on the concentration of gadolinium, sodium formate and chromate and the thickness of the gadolinium sheets. The reading step is performed using a UV/Visible spectrophotometer.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification, illustrate embodiments of the invention and, together with a general description of the invention given above, and the detailed description given below, serve to explain the invention.

FIG. 3A shows dose absorbed when using gadolinium sheets; and FIG. 3B shows dose absorbed without gadolinium sheets.

DETAILED DESCRIPTION

The following descriptions and examples illustrate some exemplary embodiments of the disclosed invention in detail. Those of the skill in the art will recognize that there are numerous variations and modifications of this invention that are encompassed by its scope. Accordingly, the description of a certain exemplary embodiment should not be deemed to limit the scope of the present invention.

The invention is a chemical dosimeter for measuring an absorbed neutron dose. The chemical dosimetry is based on a property of ionizing radiation to interact with water molecules of an aqueous solution and produce highly reactive free radicals. The free radicals induce redox reactions with metal ions that are dissolved in the aqueous solution. In the invention, the free radicals will interact with dissolved chromate ions by changing their oxidation state from the hexavalent Cr(VI) to the trivalent Cr(III) state. That is, the invention utilizes the radiation-induced reduction of chromium (VI) to chromium (III) to provide a measure of the absorbed neutron dose of a subject or object exposed to ionizing radiation in the form neutrons.

Figure 7:
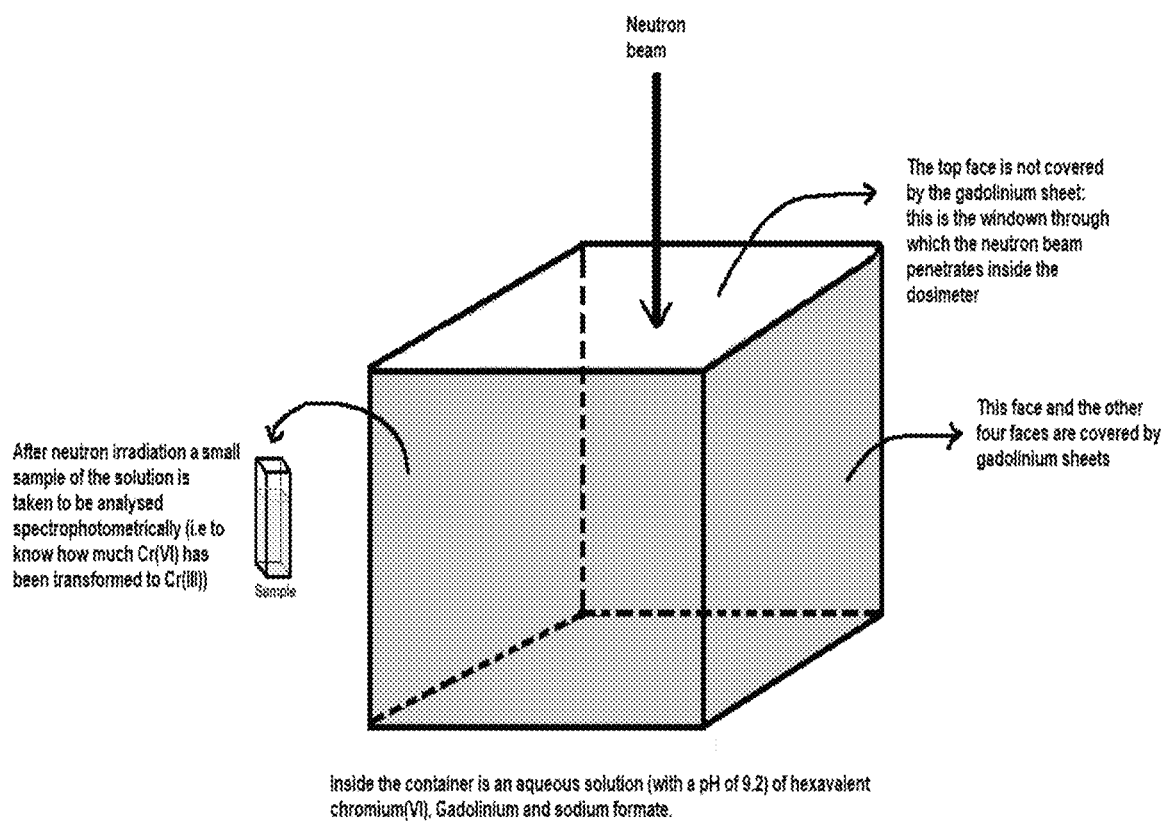
FIG. 7 shows a dosimeter according to an embodiment of the disclosure.

With reference to FIG. 7, the chemical dosimeter of the invention comprises a container holding an aqueous solution of chromate ions having an oxidation state of (VI) and gadolinium dissolved in the aqueous solution, which may have a pH of 9-9.5, e.g. 9.2, and in the presence of sodium formate. In the aqueous solution, gadolinium functions as an activator. In some embodiments, the container holds a volume of 1000 cm$^3$. Five of the container's faces are covered by gadolinium sheets. The sixth face serves as a window for receiving neutron radiation. In some embodiments, the window has a cross-sectional area of at least 10 cm×10 cm. The chromate ions have a starting oxidation state of (VI) and measuring an absorbed neutron dose comprises measuring the amount of chromate ions reduced to Cr(III) following a known or suspected exposure to neutron radiation.

Figure 8:
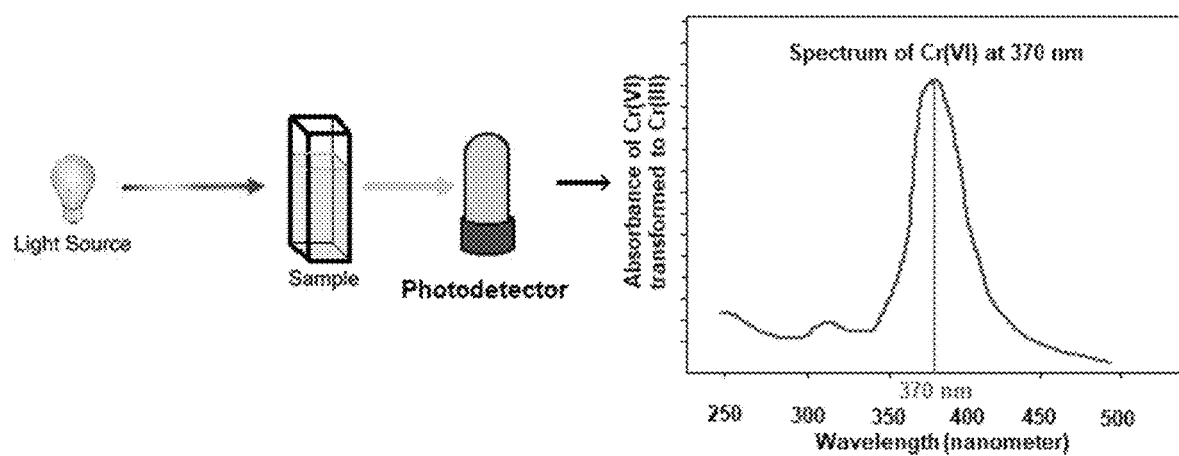
FIG. 8 shows a spectrophotometry measurement according to an embodiment of the disclosure.

With reference to FIG. 8, radiolytically bleaching of Cr(VI) is measured spectrophotometrically to determine the absorbed dose.

As used herein, the terms "neutron beam", "neutron radiation", and "thermal neutron radiation" are used interchangeably to refer to a source of neutron radiation. As used herein, the term "thermal neutrons" refers to neutrons in thermal equilibrium with a surrounding medium of temperature 290K (17° C. or 62° F.). The most probable energy at 17° C. (62° F.) for Maxwellian distribution is 0.025 eV (~2 km/s). This part of a neutron's energy spectrum constitutes the most important part of spectrum in thermal reactors. Thermal neutrons have a different and often much larger effective neutron absorption cross-section (fission or radiative capture) for a given nuclide than fast neutrons.

As used herein, the term "fast neutrons" refers to neutrons of kinetic energy greater than 1 MeV (~15 000 km/s). In nuclear reactors, these neutrons are usually named fission neutrons. The fission neutrons have a Maxwell-Boltzmann distribution of energy with a mean energy (for Uranium-235 fission) 2 MeV. Inside a nuclear reactor the fast neutrons are slowed down to the thermal energies via a process called neutron moderation. These neutrons are also produced by nuclear processes such as nuclear fission or (a,n) reactions. Fast neutrons are often detected by first moderating (slowing) them to thermal energies.

As used herein, the term "slow neutrons" refers to neutrons that have been slowed by a series of collisions with different nuclei, so that the energy of neutrons produced by fission reactions drops to the order of a few electron volts or a few fractions of an electron volt.

As used herein, the terms "neutron irradiation", and "thermal neutron irradiation" are used to refer to neutron radiation that is directed to a target, either intentionally, unintentionally, incidentally or presumptively. The target may be a dosimeter, a test dosimeter, or an experimental dosimeter. A target may also refer to a recipient who receives a dose of neutron radiation, either intentionally, unintentionally, incidentally or presumptively. The recipient may be a human or animal subject.

In one embodiments, the plurality of gadolinium sheets comprises 1 to 10 sheets, e.g. 1-6 sheets or 5 sheets of gadolinium wherein the sheets have a thickness ranging from 0.1 to 1 cm. In some embodiments, the plurality of gadolinium sheets are external to the container.

In some embodiments, the concentration of chromate ions is in the range of 0.001 mol/dm$^3$ to 0.1 mol/dm$^3$. In some embodiments, the concentration of gadolinium dissolved in the aqueous solution is in the range of 0.01 mol/dm$^3$ to 1 mol/dm$^3$. In some embodiments, the concentration of sodium formate dissolved in the aqueous solution is in the range of 0.001 mol/dm$^3$ to 0.1 mol/dm$^3$.

The sheets of gadolinium surrounding the container of the aqueous solution typically have a thickness of 0.1 to 1 centimeter. In one embodiment, the chemical dosimeter of the invention has 5 sheets of gadolinium, and each sheet has a thickness of 1 centimeter.

In one embodiment, the container of aqueous solution and the surrounding layers of gadolinium sheets are further enclosed within a plastic or glass (e.g. Plexiglass or any other tissue equivalent material) housing material. For example, common electrically conductive plastics, such as a combination of polyethylene, nylon, carbon and calcium fluoride, provides a tissue-equivalent plastic composition that is suitable for enclosing the container of the solution and the layers of gadolinium sheets.

In another embodiment, the container and surrounding layers of gadolinium sheets are further enclosed within a plastic or glass (e.g. Plexiglass or any other tissue equivalent material) housing material forming a portable or tabletop device suitable for detecting or monitoring neutron radiation, such as the hand-held device known in the art as a Geiger counter.

In yet another embodiment, the invention is a method of measuring a dose of neutron radiation. A chemical dosimeter is provided as a portable or table-top device for experimental or monitoring applications. The dosimeter comprises a container holding an aqueous solution of chromate ions having a (VI) oxidation state and gadolinium dissolved in the aqueous solution in the presence of sodium formate. Five faces of the cubic container are covered by layers of gadolinium sheets. The sixth face of the container is not covered and serves as a window to allow the neutron beam to enter the chemical dosimeter. When the dosimeter has been exposed or potentially exposed to a source of neutron radiation the dosimeter is read by determining the amount of chromate ions bleached. The chromate ions have a starting oxidation state of Cr(VI) is reduced to Cr(III) following a known or suspected exposure to neutron radiation. The reading step is performed using a UV/Visible spectrophotometer (e.g. using a Biochrom Libra S32 PC spectrophotometer) at a wavelength of 370 nanometers.

Before exemplary embodiments of the present invention are described in greater detail, it is to be understood that this invention is not limited to any particular embodiments described herein and may vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

The following Examples provide exemplary designs and methods for fabricating and using microgrippers of the invention. These Examples describe materials and methods for using embodiments illustrated in FIGS. 1-5. Additional details can be found in the section entitled "Brief Description of the Drawings".

In Examples of the invention, a Monte Carlo simulation is used to demonstrate the parameters required to build and use a dichromate solution dosimeter to measure an absorbed dose from a neutron source. A thermal neutron source with 0.025 eV energy is used as a source of radiation to test embodiments of the dosimeter. The chemical dosimeter comprises a mixture of a dichromate solution and gadolinium as activation material in the presence of sodium formate at pH 9.2. Various concentrations of dichromate ions, gadolinium and sodium formate are used to demonstrate accuracy and effectiveness and to identify a preferred combination in the Examples.

Monte Carlo simulation toolkits have been developed to help with studies and research related to radiation interaction with matter covering areas including imaging, dosimetry and radiotherapy planning [10], [11]. Using a simulation toolkit is essential when dealing with radiation so it is possible to simulate a new setup or an experiment without placing the user in harm's way. With this system, the user can train on the different parameters and setups before implementing the experiment in the lab.

Figure 1:
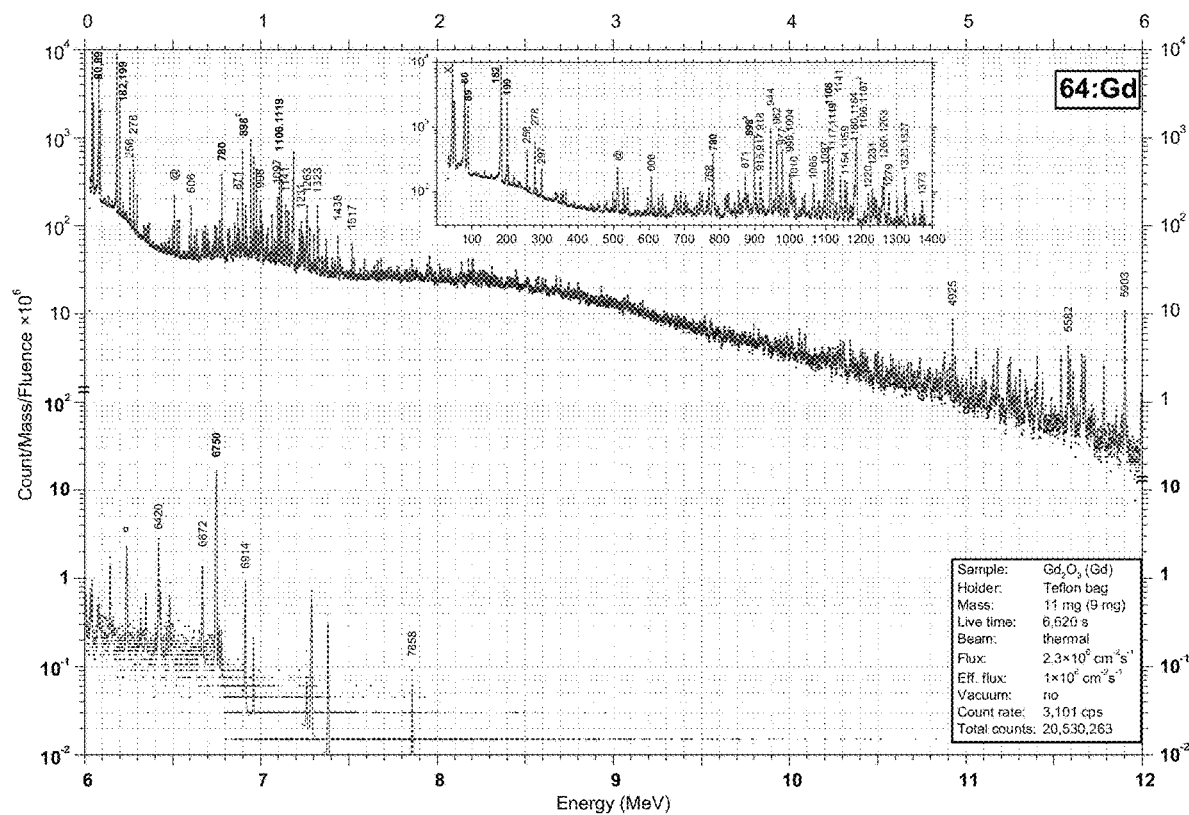
FIG. 1 shows a prompt gamma spectrum of gadolinium-157.

Geant4 Application for Tomographic Emission (GATE) is an open source simulation toolkit that has been widely used in many radiation applications. GATE has been used for imaging applications for X-ray and computer tomography (CT) scans dosimetry for calculations and dose enhancement using nanoparticles, radiation therapy using linear accelerators and heavy ions therapy and some researchers used it for shielding studies. GATE has a tool called "Actor" that gives the ability to control the output focusing on one or more parameters to obtain the best results. To run a simulation, some parameters need to be defined; the object to be tested, radioactive source with a specific energy or spectrum, and a way to collect and save the output of the simulation. In addition, a physics list that must be identified for the simulation. The physics list is the library which the simulation toolkit will use to calculate and track the interaction of radiation with matter HIPS_QS, since the interactions involve a neutron source with energy below 20 MeV. There are two methods of adding new materials or mixtures into the simulation, either by using the chemical formula of the material or by defining the fraction of each element or mixture (this is useful when making a material with nanoparticles or solution mixtures). In the Examples of the invention, the sample was a water-based mixture with gadolinium for prompt gamma production from the neutron interaction with the sample. Gadolinium was used for its high thermal neutron cross section and the prompt gamma it produces, as shown in FIG. 1.

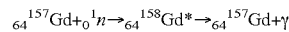

This gamma is assumed to produce highly reactive free radicals which reduce the Cr(VI) to Cr(III) according to the following chemical reactions sequence:

$$e_{aq}^- + N_2O \rightarrow O^- + N_2$$

$$O^- + H_2O \rightarrow OH^* + OH^-$$

$$OH^* + HCO_2^- \rightarrow H_2O + CO_2^{*-}$$

$$H^* + HCO_2^- \rightarrow H_2 + CO_2^{*-}$$

$$Cr(VI) + CO_2^{*-} \rightarrow Cr(V) + CO_2$$

$$Cr(V) + Cr(V) \rightarrow Cr(VI) + Cr(IV)$$

$$Cr(IV) + Cr(V) \rightarrow Cr(III) + Cr(VI)$$

leading to the trivalent and stable Cr(III).

Example 1

A total of eight mixtures were tested in simulations, as shown in Table 2.

TABLE 2

Materials fractions for each mixture.

| Sample # | Code | Water Fraction | Water Mol/dm³ | Gadolinium Fraction | Gadolinium Mol/dm³ |
|---|---|---|---|---|---|
| 1 | M0 | 1 | 55.56 | — | — |
| 2 | M1 | 0.9999 | 55.55 | 0.0002 | 0.01 |
| 3 | M2 | 0.9984 | 55.46 | 0.0018 | 0.1 |
| 4 | M3 | 0.984 | 54.56 | 0.018 | 1 |
| 5 | M4 | 0.84 | 45.56 | 0.18 | 10 |

Various concentrations of gadolinium were tested to find the optimum concentration to use before reaching a plateau where adding more material does not affect the simulation output. The simulation runs were performed for each mixture using thermal neutron at energy 0.025 eV. The neutron source was simulated as a point source. Rather than making the source an isotropic source, a biasing directional cone was used, thus forcing the beam toward the mixture to increase the statistic power while simultaneously not wasting computational time with neutrons interacting away from the mixture.

Dose actor and spectrum actor were used to obtain the output, with both types of actors attached to the sample. In total, six dose actors were used: total dose actor, proton dose actor, electron dose actor, neutron dose actor, gamma dose actor and alpha dose actor. The size of the actor was the same as the mixture sample making it as one voxel. By doing so, the total dose of the sample can be considered without any regard to the interaction location. This setup was used because during the experimental work, random aliquots of 4 cm³ were extracted from the starting volume of 10×10×10 cm³ of the mixture for measurements. Since the mixture is shaken to mix the contents prior to extracting each aliquot, the location of the interaction is not a variable, and each 4 cm³ aliquot taken from the mixture represents the overall concentration of Cr (VI) in the mixture.

Representative results from measurements of these aliquots are shown in Table 3 and FIGS. 3A, 3B, 4 and 5.

For a chemical dosimeter using Cr (VI) transformation to Cr (III), the radiation interaction with the mixture that is of interest are the gamma and electron interactions with the mixture, where the gamma interaction results in a free electron and the electron interaction is a free electron and free radical particles (hydroxide radical (*OH) and hydrogen atom (*H). For this reason, only the spectrum of the gamma and electron were obtained from the simulation when using two spectrum actors.

Figure 2:
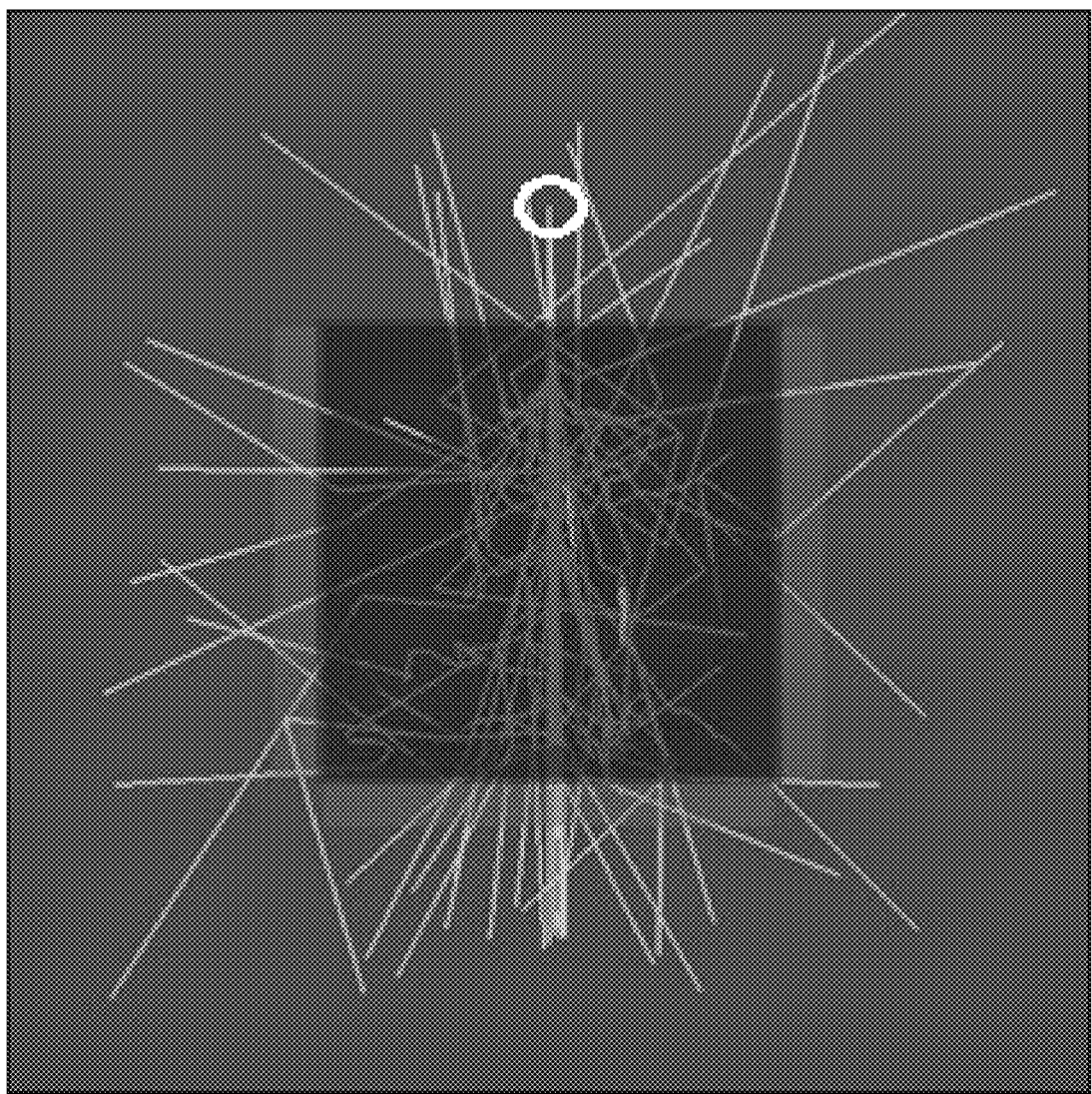
FIG. 2 shows a diagram of a simulation setup, with a white circle showing the source location.

A sample box was used to hold the dichromate mixture for the experimental setup. FIG. 2 shows a diagram of the sample box (darkest square, center) for holding the dichromate mixture. The box was fabricated either 1) without any sheets of gadolinium, or 2) with 5 sheets of 1 cm-thick gadolinium enclosing the box except for a front window positioned to allow entry of radiation from the radiation source (white circle). The gadolinium sheets were added to study the increment of probability of neutron interactions within the sample, which in turn increases the prompt gamma. The sample size was 10×10×10 $cm^3$ within the sample box. The thermal neutron beam (white band projecting perpendicularly from white circle) with energy 0.025 eV as the radiation source (white circle) was placed in front of the sample box (darkest square), arranged so that the thermal neutron beam projected into the front window in the gadolinium. 10M particles were used as the run history giving an output with uncertainty 4%. Theoretical particle pathways are illustrated as random thin green lines.

Figures 3A, 3B:
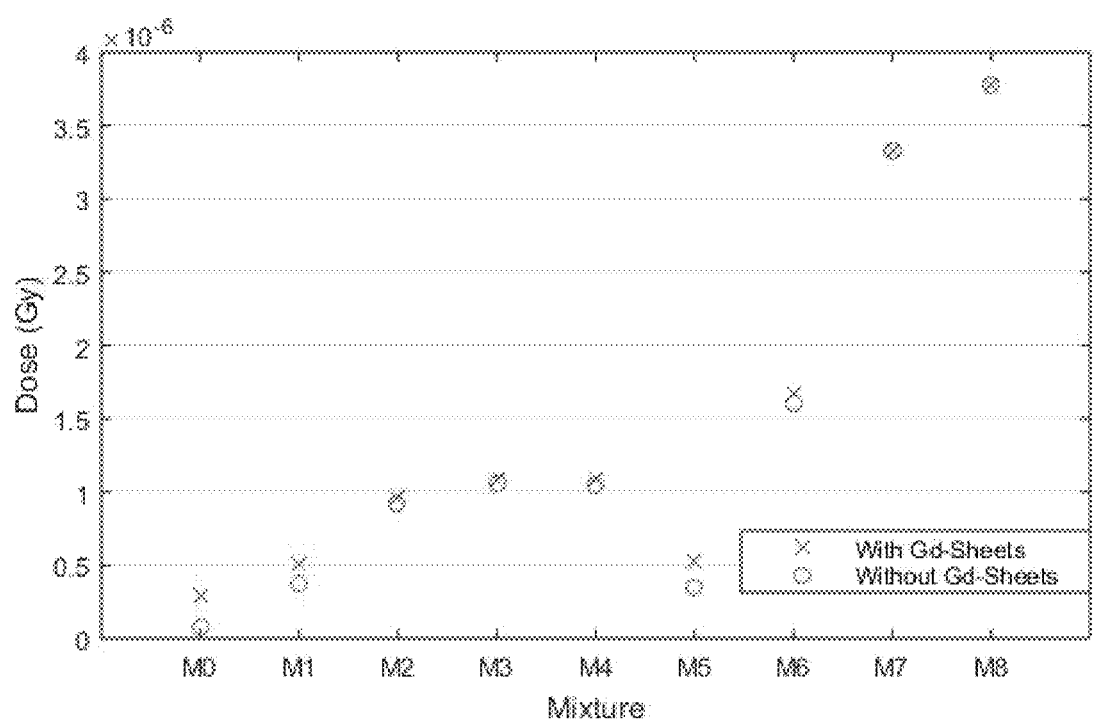
FIGS. 3A and 3B shows dose absorbed from each type of particle with two different dosimeter configurations.

FIG. 3A shows the resulting dose from a thermal source sample for each of mixtures M0 to M4, which included gadolinium. There was little incremental difference in dose as the concentration increased for the gadolinium. FIG. 3B shows the contribution of the neutron, electron or gamma particles to the dose from the thermal neutron source. It is interesting to notice that the neutron dose is the lowest, followed by the proton dose, while the highest being the electron dose, followed by gamma for the pure water sample (Mixture 0). When adding gadolinium to the water solution, a small stable increment is shown for both gamma and electron doses while dose from recoiled alpha and neutrons are decreased.

Table 3 shows the total dose enhancement factor and the dose enhancement factor for gamma and electrons when surrounding the tank with gadolinium for each type of mixture.

produced and as quantity of gamma compared to having just water. The spectrum generated is similar to the gadolinium gamma activation spectrum with the addition of the water activation gamma.

Example 2

Figure 6:
FIG. 6 shows various embodiments of portable dosimeters.

The dosimeter of the invention is enclosed within a plastic or glass housing material forming a portable or tabletop device suitable for detecting or monitoring neutron radiation, such as the hand-held device known in the art as a Geiger counter. An example of a hand-held device that can be used to house the chemical dosimeter is shown in FIG. 6. The device can be used to monitor for the presence of neutron radiation.

There are many neutron dosimeters available to use for different applications. However, only the chemical dosimeters of the invention have shown the ability to work under a high flux dose beam. The dichromate solution of the invention has the capability to work under a high dose flux exceeding what other chemical dosimeters can withstand, while also being tissue-equivalent. In addition, the dichromate solution maintains good pre- and post-irradiation stability that does not fade over time. One of the most significant advantages of the dichromate solution is that the chemicals used are widely available and inexpensive. In addition, the dose is easily read using available devices that can be small and portable. Using the GATE simulation toolkit as a Monte Carlo simulation platform demonstrates the functionality of the method for using dichromate solution as a dosimeter for neutrons. Moreover, the simulation of Example 1 is an embodiment of the invention wherein the dichromate solution generates a measurable signal when using thermal neutrons that is suitable for interpretation as a dosimetry signal.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

TABLE 3

Dose enhancement factor for each mixture compared to water for total dose, gamma dose and electron dose when using a thermal neutron source.

| | Total Dose | | Gamma Dose | | Electron Dose | |
|---|---|---|---|---|---|---|
| Mixture | Dose with Sheets | Dose without Sheets | Dose with Sheets | Dose without Sheets | Dose with Sheets | Dose without Sheets |
| M0 | 3.64 | 1.00 | 6.35 | 1.00 | 3.43 | 1.00 |
| M1 | 6.52 | 4.81 | 10.77 | 6.70 | 6.19 | 4.66 |
| M2 | 12.16 | 11.71 | 19.41 | 17.00 | 11.60 | 11.26 |
| M3 | 13.75 | 13.36 | 23.09 | 20.35 | 13.03 | 12.77 |
| M4 | 13.65 | 13.21 | 28.12 | 24.56 | 12.37 | 12.09 |

It can be concluded that the best combination would be having 1 mol/$dm^3$ of gadolinium for 1 $dm^3$ of water sample surrounded by the 5 gadolinium sheets. These results show that having a mixture with gadolinium would highly affect the output obtained while adding more than 5 sheets to the surrounding material will not be a huge boost to the dose from gamma.

Figure 4:
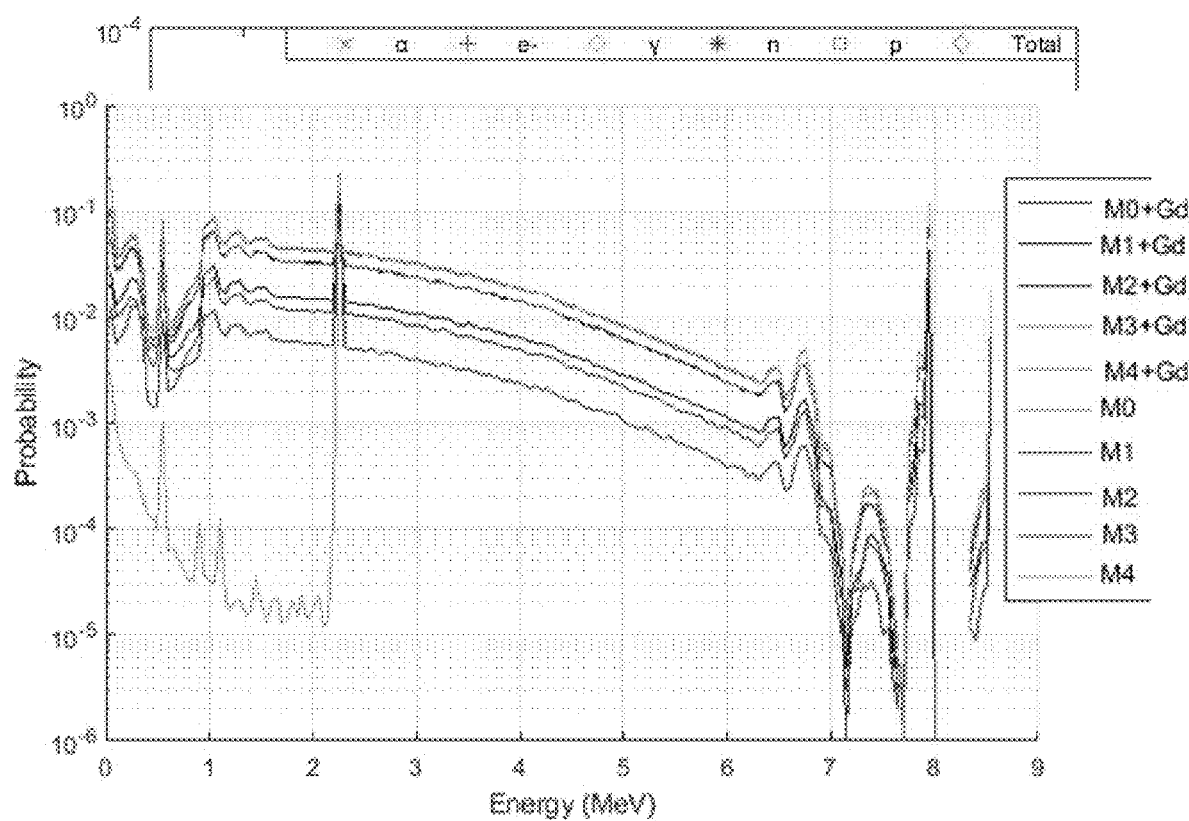
FIG. 4 shows a prompt gamma spectrum generated for each run when changing the mixture and adding five Gd-157 sheets.
Figure 5:
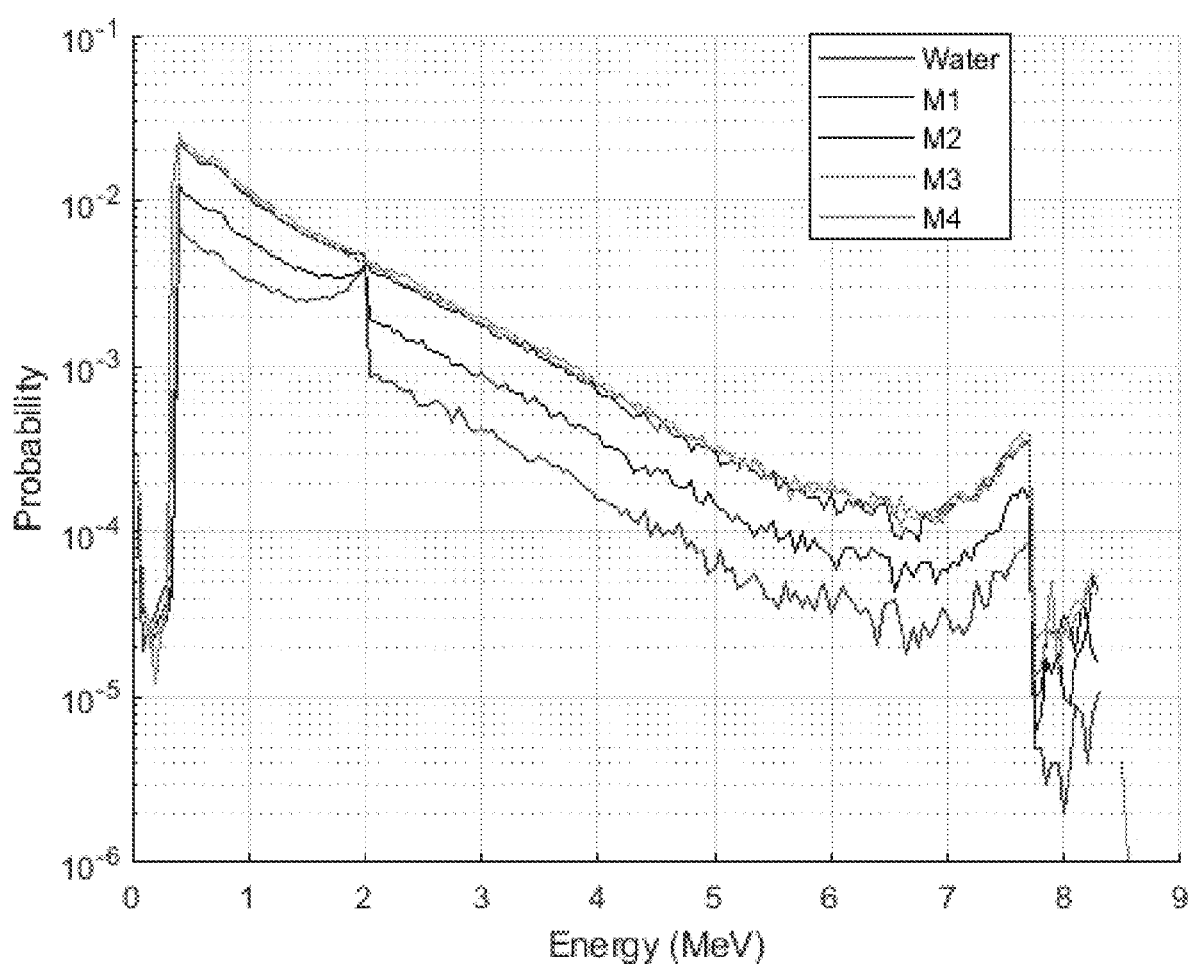
FIG. 5 shows an electron spectrum generated for each run when changing the mixture.

FIG. 4 shows the energy spectrum of the absorbed gamma and FIG. 5 shows the electron spectrum absorbed in the mixture. Adding gadolinium as sheets or to the mixture greatly increases the gamma spectrum as gamma energy

We claim:
1. A chemical dosimeter for measuring an absorbed neutron dose, comprising:
    a container holding an aqueous solution which includes chromate ions in a hexavalent state (Cr(VI)), gadolinium, and sodium formate, and
    one or more gadolinium sheets which surround the aqueous solution, wherein the one or more gadolinium sheets comprise a window which permits both dosing of the aqueous solution with neutron radiation from an environment outside of the container.

2. The chemical dosimeter of claim 1, wherein the one or more gadolinium sheets comprises 1 to 5 sheets of gadolinium wherein the sheets have a thickness ranging from 0.1 to 1 cm.

3. The chemical dosimeter of claim 1, wherein the window has a cross-sectional area of 10 cm×10 cm.

4. The chemical dosimeter of claim 1, wherein the container holds a volume of 1000 $cm^3$.

5. The chemical dosimeter of claim 1, wherein the one or more gadolinium sheets are external to the container.

6. The chemical dosimeter of claim 1, wherein the concentration of chromate ions is in the range of 0.001 $mol/dm^3$ to 0.1 $mol/dm^3$.

7. The chemical dosimeter of claim 1, wherein the concentration of gadolinium dissolved in the aqueous solution is in the range of 0.01 $mol/dm^3$ to 1 $mol/dm^3$.

8. The chemical dosimeter of claim 1, wherein the concentration of sodium formate dissolved in the aqueous solution is in the range of 0.001 $mol/dm^3$ to 0.1 $mol/dm^3$.

9. The chemical dosimeter of claim 1, wherein the aqueous solution has a pH of 9.2.

10. The chemical dosimeter of claim 1, further comprising a plastic or glass housing in which the container is positioned.

11. The chemical dosimeter of claim 10, wherein the housing forms part of a portable or tabletop device suitable for detecting or monitoring neutron radiation.

12. A method of measuring a dose of neutron radiation, comprising:
    exposing an aqueous solution which includes chromate ions in a hexavalent state (Cr(VI)), gadolinium, and sodium formate dissolved in the aqueous solution to neutron radiation;
    determining the conversion of chromate ions from the hexavalent state (Cr(VI)) to a trivalent state (Cr(III)) in the aqueous solution based on a spectrophotometric measurement; and
    determining the neutron radiation absorbed by the aqueous solution based on the amount of Cr(VI) bleached measured by spectrophotometry.

13. The method of claim 12, wherein the exposing step is performed through one face of a container that contains the aqueous solution.

14. The method of claim 12, wherein the determining step is performed by calculating the dose using the formula:

$$\text{absorbed dose (Gy)} = 1.04 \times 10^3 \times \Delta(OD)$$

where $\Delta(OD)$ is the change in the absorbance at 370 nm of the irradiated Cr—Gd-formate solution.

* * * * *